United States Patent [19]

Buettner

[11] 3,820,513
[45] June 28, 1974

[54] ROTARY ENGINE
[76] Inventor: Otto A. Buettner, P.O. Box 398, Daleville, Ala. 36322
[22] Filed: May 24, 1972
[21] Appl. No.: 256,348

[52] U.S. Cl.............................. 123/8.17, 123/8.33
[51] Int. Cl........................................... F02b 53/00
[58] Field of Search ....... 123/8.27, 8.33, 8.31, 8.17; 418/248

[56] References Cited
UNITED STATES PATENTS
1,319,932  10/1919  Stevenson.......................... 123/8.17
2,296,768   9/1942  Cochran ............................ 123/8.27
FOREIGN PATENTS OR APPLICATIONS
496,590  11/1930  Germany .......................... 123/8.33

*Primary Examiner*—Carlton R. Croyle
*Assistant Examiner*—Michael Koczo, Jr.
*Attorney, Agent, or Firm*—Schlesinger, Arkwright, Garvey & Dinsmore

[57] ABSTRACT

An internal combustion engine has a plurality of rotating chambers disposed and turning within a rotor and which are successively connected to compression and expansion channels on the peripheral surface of the rotor which, together with the interior annular surface of the housing and depending gate valve elements form compression and expansion chambers as the rotor turns.

16 Claims, 5 Drawing Figures

ROTARY ENGINE

SUMMARY OF INVENTION

This invention relates to internal combustion engines and more particularly to a radial internal combustion engine.

This engine provides a new type of rotary engine which is compact, of simple construction, and has relatively few moving parts.

All of the moving parts in the engine are mounted for rotational movement, eliminating reciprocal movement within the engine, thereby considerably reducing vibration and stresses associated therewith.

A special rotor construction which includes a plurality of firing chambers and external compression and expansion channels disposed on the outer periphery of the rotor, to which the firing chambers are periodically connected, provide a different type of firing cylinder combination which eliminates the need for the conventional type of internal combustion cylinder.

A first cam channel circumferentially disposed on the peripheral surface of the rotor cooperates with a second such channel disposed beside it in a novel manner to provide for intake, compression, expansion and exhaust functions.

The compact rotor construction results in a compact construction, with very few special parts, serving the operative functions and acting as a flywheel.

These and other features and advantages of the invention will become apparent from the following description.

DESCRIPTION OF THE INVENTION

Figure 1:
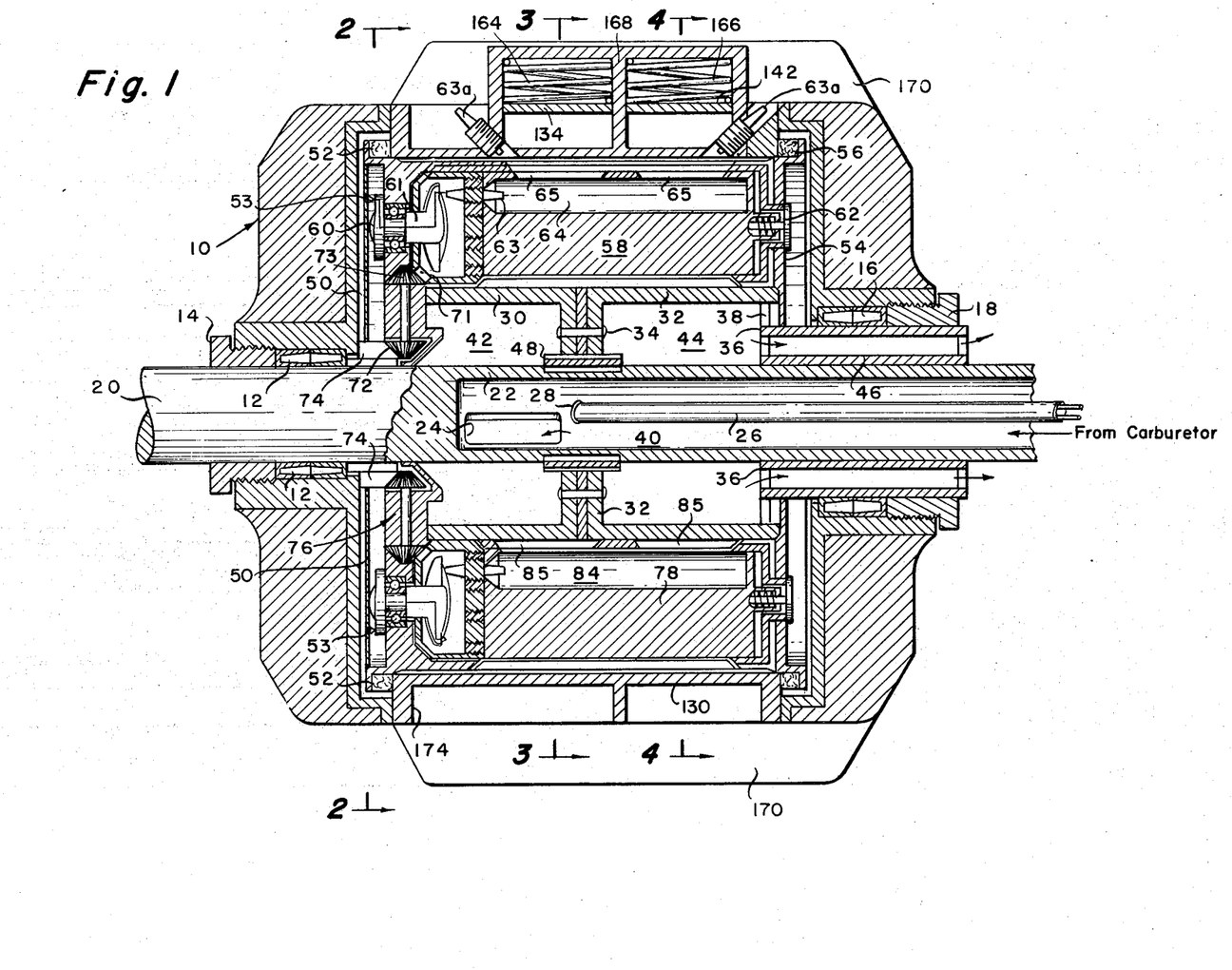
FIG. 1 is a cross-sectional view of the engine.

Referring particularly to the drawings, FIG. 1 shows a housing generally indicated at 10 which has a front roller-bearing 12 held in position by a threaded collar sleeve 14 and a rear roller-bearing assembly 16 held in position by a threaded collar sleeve 18. The rotor propeller output shaft generally indicated at 20 extends through and is supported by the bearing assembly. It has a rear hollowed section 22 and an intake opening 24. Ignition wires 26 extend along the rear interior portion of the propeller shaft 22 and pass through the opening 28.

Figure 3:
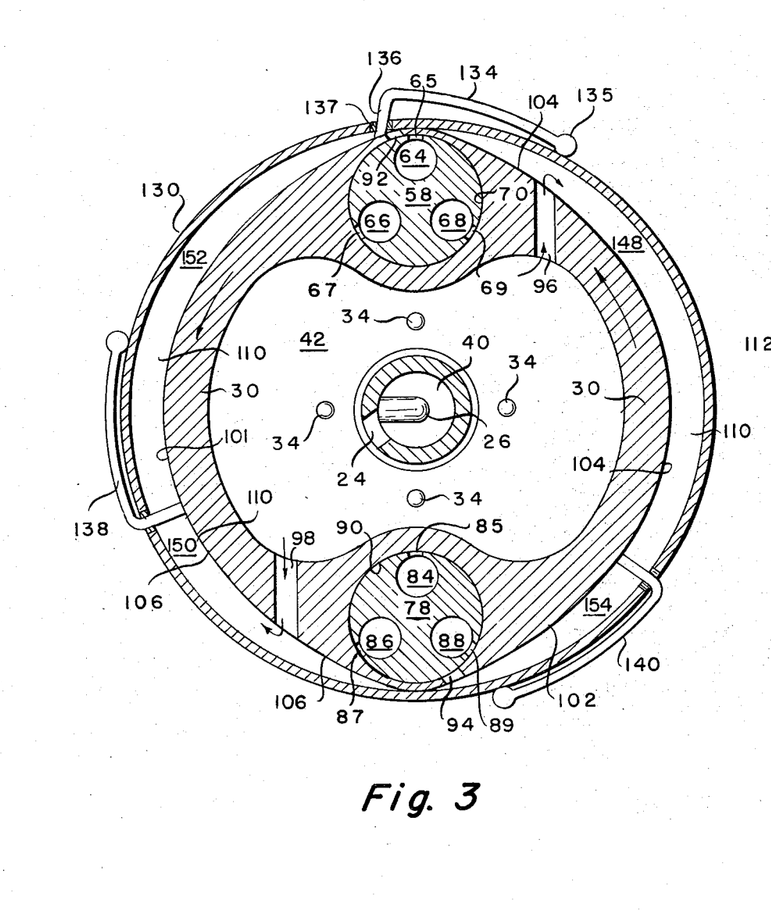
FIG. 3 is a sectional view along line 3—3 of FIG. 1 showing the interrelationship of the firing cylinders and the intake-compression channel.
Figure 4:
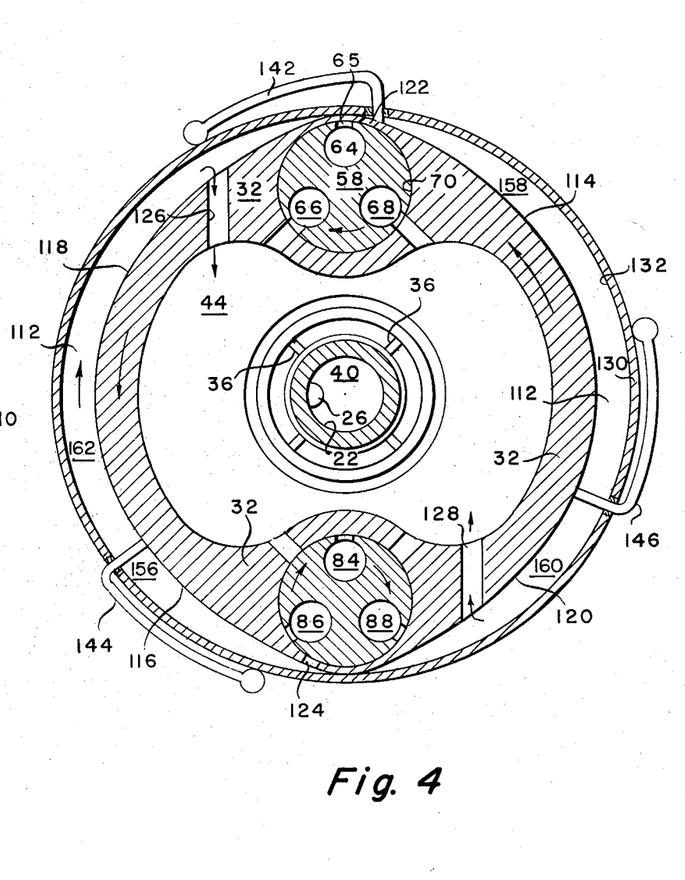
FIG. 4 is a section along line 4—4 of FIG. 1 showing the relationship of the firing cylinders with respect to the expansion exhaust channel.

Front section rotor casting 30 and rear section rotor casting 32 are held together by rivets 34, forming the basic rotor assembly, the shape of which is shown in FIGS. 3 and 4. The double-walled annular exhaust gas conduit 36 is disposed between rear bearing 16 and the rotor shaft 20. Its inner end supports the flat annular rotor support member 38 which is integrally connected to the rear portion of rotor casting 32. The central hollow interior portion 22 of the rotor shaft 20 provides the axial fuel-gas passage 40 for the charge which flows through the opening 24 and into the rotor fuel-gas inlet chamber 42 within the forward rotor casting 30. The separate rotor exhaust gas chamber 44 is formed by the rear rotor casting 32. Exhaust gas is vented to atmosphere through the annular exhaust gas passage 46. The rotor castings are keyed to shaft 20 by the spline coupling 48.

The front support piece 50 of the rotor is integrally connected to rotor casting 30 and supports annular seal assembly 52. The rotor rear support plate 54 is integrally connected to the rear rotor casting 32 and supports annular seal assembly 56.

A first rotatable firing cylinder 58 is supported by the front bearing and ignition rotor assembly 60 at one end and by the rear bearing assembly 62 at the rear end thereof.

The firing cylinder 58, as can be seen in FIGS. 3 and 4, contains three separate firing chambers 64, 66 and 68.

The construction and ignition circuit for all of the firing cylinders is similar. Referring to FIG. 1, the bearing and ignition assembly 60 has an ignition line 61 which is directly connected to the spark plug 63 of firing chamber 64. There is a contact point 53 disposed on the inside surface of the front rotor cover which is electrically connected to the ignition wiring 26, so that when the rotor 60 sweeps through the vertical firing position line 61 receives voltage to fire plug 63. Similar separate ignition lines are set up for each firing chamber. Firing chamber 64 has a set of ports 65, one port being an inlet port through which compressed gases pass, and the second port beigh an outlet port through which burned gases under pressure are passed to the expansion chamber. Firing chambers 66 and 68 respectively, have sets of ports 67 and 69 similar to those for firing chamber 64. These ports connect to the sealing interface 70 between the outer cylindrical surface of the rotating firing cylinder 58 and the bore through rotor castings 30 and 32.

An alternate method of firing the chambers is shown in FIG. 1. Fuel injectors 63a would supply the fuel charge at peak compression.

Figure 2:
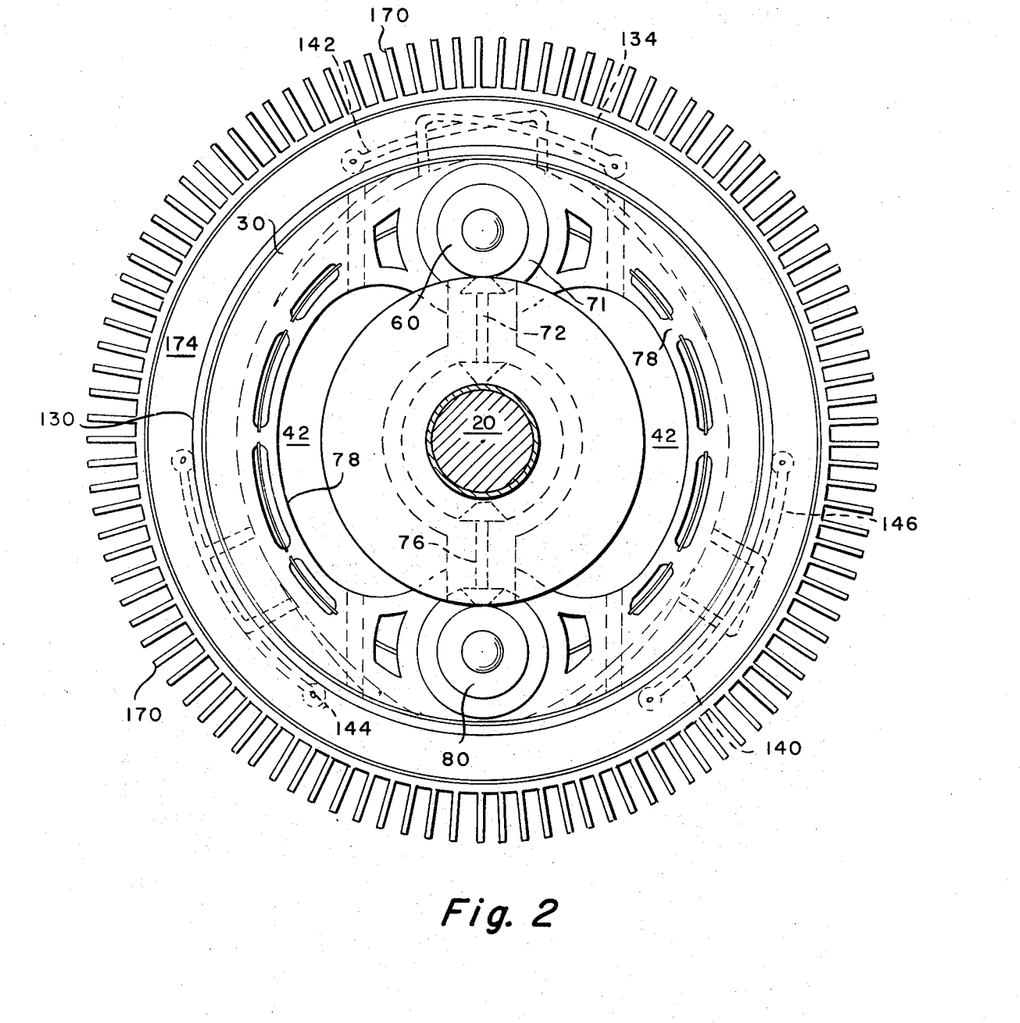
FIG. 2 is a sectional view along line 2—2 of FIG. 1.

Referring to FIGS. 1 and 2, the front face of the rotating firing cylinder has an annular bevel gear face 71 which engages the driven bevel gear 73. The lower bevel gear 72 meshes with the annular collar gear 74 which is fixedly connected to the housing and the outer race of the front bearing assembly 12. The gear ratio is such that for each counterclockwise revolution of the rotor assembly the three-barrel firing cylinder 58 makes one revolution in a clockwise direction.

A second lower bevel gear assembly 76, similar to that just described, controls rotation of a second three barrel firing cylinder 78 which is supported by the front bearing and ignition assembly 80 and the rear bearing assembly 82. This structure is similar to that of the first three barrel firing cylinder. The firing cylinder 84 has its spark plug 83 connected to ignition wire 81 and has a set of ports 85. Similar construction is used for the firing cylinders 86 and 88 which are respectively displaced 120° apart, and also have a set of inlet ports respectively 87 and 89.

The rotatable firing cylinder 78 has a cylindrical external surface which interfaces in sealing engagement at 90 with the internal cylindrical surface of the rotor castings 30 and 32.

FIG. 3 shows the manner in which the charge is supplied to the firing cylinders and the interaction of the gate, and rotor and housing surfaces to effect intake and compression of the gas fuel charge. The rotor has compression ports 92 and 94 through which the compressed fuel gas mixture is supplied successively to the firing cylinders when the inlet port comes into registry therewith. Intake passages 96 and 98 connect the fuel-gas inlet chamber 42 of casting 30 with the exterior surface of the casting 30. The exterior surface of the rotor casting 30 has respectively first and second compression surfaces 101 and 102 which are associated respectively with the first and second rotating cylinders 58-78.

These surfaces are disposed before the rotor compression ports 92 and 94. The first and second intake surfaces 104 and 106 of the rotor are disposed adjacent the rotor intake passages 96 and 98 respectively.

Figure 5:
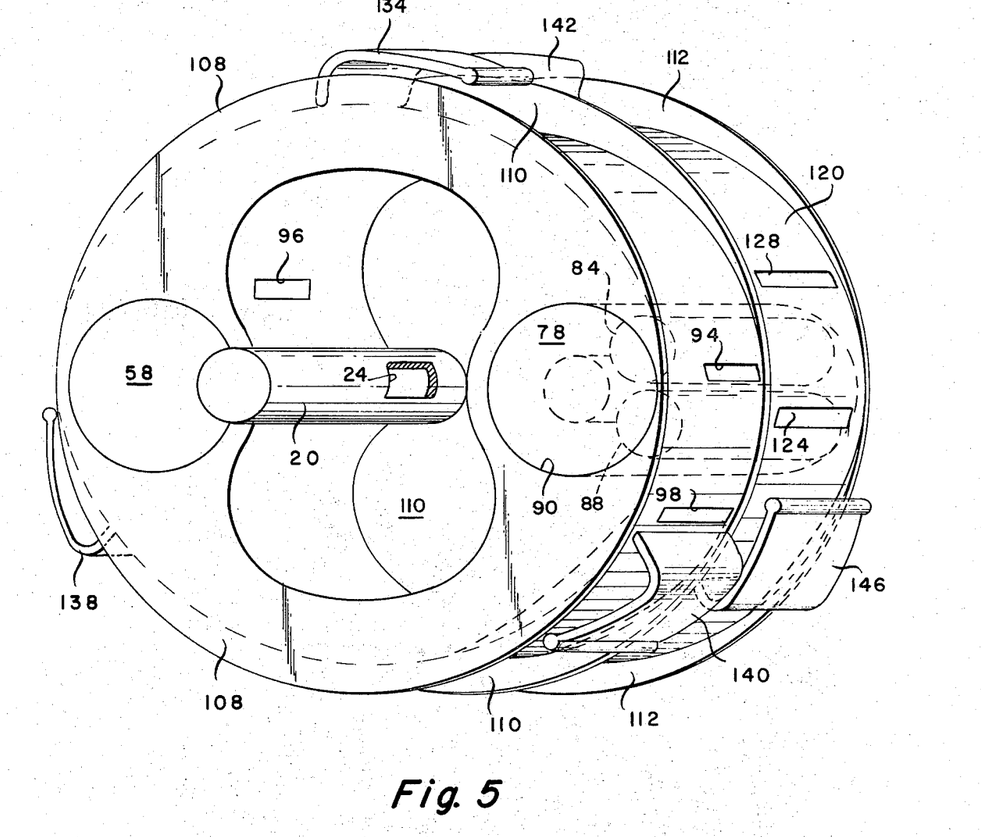
FIG. 5 is a perspective view grammatically showing the relationship of the rotor channels and the pivoted gate valves.

In FIG. 5, the respective view shows the general external construction of the external peripheral surface of the rotor. In this view the rotor is shifted counterclockwise 90° with the second firing cylinder 78 shown with its porting arrangements. The intake and compression channel is shown with the circular intake and compression end flange 108 and the circular middle flange divider wall 110 forming a channel with the second compression surface 102. Each of the smooth radial surfaces of rotor 30 on either side of the dividing flange 110 has at least two flattened sections 180° apart. The flattened sections on one side of flange 110 are angularly offset with respect to the set of flattened sections on the other side of flange 110. In FIG. 3 the depth of the channels and the cross-sectional shape thereof is clearly shown between the outer surfaces of the rotor and the middle circular flange 110. The outer circular end flange 112, together with end wall 110, define the side walls for the expansion and exhaust channel of the rotor, details of which are illustrated in FIG. 4.

The peripheral wall of rotor casting has a first combustion cam surface 114 and a second combustion surface 116. The other portions of the rotor surface have a first exhaust cam surface 118 and a second exhaust cam surface 120. First and second high pressure expansion ports 122 and 124 are respectively positioned at the beginning of the first and second expansion combustion cam surfaces 114 and 116. First and second exhaust passages 126 and 128 are respectively connected to the first and second exhaust cam surfaces 118 and 120 and then to the interior of the rotor to the rotor exhaust gas chamber 44 within casting 32.

The outer peripheral wall for both of the rotor channels is formed by the interior circular surface 132 of the annular housing ring 130. Surface 132 is disposed in close sealing engagement with the peripheral surfaces of the rotor flanges 108, 110, and 112.

Each of the channels has three pivoted gate valves spaced 120° apart and extending through the annular interior housing ring 130. For the intake compression channel the gate valves are shown without the spring biasing assembly illustrated in FIG. 1. Upper gate valve 134 has a pivoted circular member 135 mounted on the housing, and a channel blocking gate leg 136 which extends down through an opening in the annular housing ring 130 and through a seal 137 to sealing and slidingly engage the cam surfaces of the rotor. With the rise and fall of the cam surfaces as the rotor rotates the gate valve 134 will move upwardly or downwardly through the seal 137. The gate valve leg 136 is the same width as the channels and its side edges respectively engage the rotor end flange 108 and the rotor middle sealing flange 110. The structure and operation of gate valves 138 and 140 are similar to that of gate valve 134.

The gate valves 142, 144, and 146, shown in FIG. 4, operate in the expansion and exhaust channel between middle sealing flange 110 and end sealing flange 112. They are oriented in the opposite direction to the intake and combustion channel gate valves, but are of similar construction and operate in the same fashion. All of the gate valves are disposed 120° apart to successively service the three firing chambers of the rotating firing cylinder.

In FIG. 3 the space 148 between the intake cam surface 104 and the inner surface 132 of the housing annular ring 130 extends from the high point of the cam which is in direct sliding contact with the inner surface 132 and the gate portion of gate valve 140. It will be noted that this gap moves circumferentially about the housing in a counterclockwise direction and that the proximity of the contact point between the cam surface and the housing to the nearest gate valve, in this instance 140, determines the volume of the intake chamber. A similar type of intake chamber 150 is shown adjacent rotor surface 106 and gate valve 138. There is 120° displacement, and it can be seen that this chamber volume is small and will get progressively larger as the rotor moves in a counterclockwise direction. Directly behind valve 138 is the compression chamber 152. This chamber was previously filled with a charge through the intake passage 98, but once the passageway passed the gate valve 138, the intake passage was cut off, and the volume of the cylinder progressively reduced. On the other side of the rotor, the compression chamber 154 immediately disposed behind gate valve 140 is shown in a further state of rotation of the rotor. This chamber has the fuel-gas mixture therein under high pressure and will discharge it at a point further along in this rotation through the rotor intake port 94 when it lines up with the intake port 89 of firing cylinder 88. Thus, it can be seen that the two major crescent-shaped areas between the rotor and the circular housing ring are divided by the gate valves into intake and compression chambers.

The expansion exhaust channel operates in a similar fashion. In FIG. 4, the expansion chamber 158 behind gate valve 142 is about to receive the charge from the firing cylinder 64. The expansion chamber 156 disposed behing gate valve 144 is shown after it has received a charge from firing cylinder 86 through second combustion expansion port 124 of the rotor. This is the work-stroke of the engine. Expanded combustion gases from previous firings which are respectively contained in exhaust chambers 160 and 162 are pushed out of the chambers by their gate valves through the exhaust passages 126 and 128 as their volume progressively decreases.

The gate valves are held with their lower edge in firm sealing and sliding contact by spring assemblies. FIG. 1 shows the spring assembly for the gate valves 134 and 142, wherein a coil spring 164 is pressed into contact with gate valve 134 and the coil spring 166 presses down on gate valve 142. These springs are contained in a special housing 168 which is typical for the other two sets of gate valves. Cooling fluid is circulated through annular passageway 174 and the spaces between other parts of the unit.

OPERATION

The rotor is turned when the engine is started with electrical power being supplied through the ignition wires 26, to the ignition rotor assemblies 60 and 80 through a contact point 59. The air fuel mixture flows from the cavity 40 through the opening 24 into the rotor fuel-gas inlet chamber 42, as can be seen in FIGS. 1 and 3. The fuel-gas mixture is then drawn through the rotor intake passages 96 and 98 into the crescent-shaped intake chambers 148 and 150 which are increasing in volume as the rotor moves the chamber in a counterclockwise direction away from their respective end gates 140 and 138, illustrated in FIG. 3. Simultaneously, variable volume compression chambers 152 and 154, formed behind gates 138 and 140 respectively, are diminishing in volume and compressing the previously accumulated gas-fuel charge. It will be noted that once the gas fuel intake passages 96 and 98 pass under one of the gate valves the passage behind the gate changes from an intake chamber to a compression chamber.

As the rotor continues in its counterclockwise direction, the compression chambers are reduced in volume, compressing the gas fuel mixture. When one of the firing chambers, such as firing chamber 88 of the lower rotatable three-barrel firing cylinder 78, has its inlet port 89 come into registry with the rotor intake port 94, the compressed charge flows into the firing chamber. The firing chambers are rotated clockwise within the rotor so that they successively sweep past the gas-fuel compression ports 92 and 94. Their movement is synchronized with the movement of the rotor by means of the bevel gear assemblies 72 and 76 shown in FIG. 1.

Once a firing chamber, such as on chamber 64, has swept past the intake port 92 receiving its charge, electrical charge is passed through its respective ignition line, such as 61, to ignite its spark plug 63. With reference to firing chamber 64, it will be noted that one of the dual ports 65 serves as an intake port, while the other serves as an exhaust port, as shown in FIG. 1.

The ignition and expansion cycles of the engine are illustrated in FIG. 4. Firing chamber 64 having received its charge through compression port 92, is fired at the position shown by its spark plug as it travels from compression (FIG. 3) port 92 to expansion port 122, where it will discharge the ignited high pressure gases through the port and into the expansion chamber 158 behind the gate valve 142. High pressure chamber 156 shows the relative position of the parts shortly after the high pressure ignited charge has been received in the chamber. Firing cylinder 86 is moved on past the expansion port 124 and is now moving toward the exhaust passages, shown in FIG. 4.

The spent combustion gases are purged from chambers 160 and 162 through the rotor exhaust passages 128 and 126 respectively. These gases flow into the exhaust chamber 44 and then axially through the cylindrical exhaust passage 46 to atmosphere.

Each of the firing chambers is successively activated at 120° intervals, giving six power impulses for each revolution of the rotor.

The gate valves are held in tight sliding and sealing engagement with the respective surfaces of the channels, and are pressed downwardly in forcible engagement with the cam surfaces of the rotors by the coil spring assemblies shown in FIG. 1. In all of the parts, there is close dimensional stability and tight sliding sealing engagement.

The perspective view of the rotor shown in FIG. 5, and FIGS. 3 and 4, clearly shows the manner in which the adjacent cam shaped surfaces operating with enclosed walls provide respectively an intake and compression function, and a power stroke and exhaust function, as the firing chambers are each rotated successively to ports connected to one channel and then the other.

The relative position of the gate valves with respect to the ports in the cam surface which it engages, provide for either of the two functions of that particular cam channel; that is, for example, in the first channel, whether the effect produced is either intake or compression of the gas charge.

There are many different possibilities of construction, permitting varying numbers of firing cylinders or of cam lobes, based upon the fundamental concept, a particular modification of which is described above. In addition, it is possible to use a firing chamber which would rotate about its center and be self-porting, or to employ a fixed chamber equipped with revolving, sliding ports or poppet valves.

Furthermore, with respect to the firing mechanisms, it would be possible to use different types of spark plug arrangements and wiring systems, or to employ a fuel-injection system, wherein fuel oil would be sprayed into the firing chambers after they have received their compressed charge.

The configuration and size of the inlet and outlet ports, and the cam and channel surfaces will depend upon the function and conditions to be met 65 operation; the drawings are for illustration purposes to show their positioning and general functions with respect to the other working part of the unit.

With regard to the ignition assembly, it is also possible to make the ignition rotor stationary and merely move the contact 51 to a point thereon where the ends of each spark plug will have wiping contact with it at the ignition position.

While this invention has been described in relation to a particular embodiment, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An internal combustion engine, comprising:
   a. a generally annular-shaped four-walled variable volume intake and compression chamber unit having two walls which are relatively movable with respect to each other and are shaped so as to successively and gradually converge and diverge from each other during the course of their relative movement,
   b. a generally annular-shaped four-walled variable volume expansion and exhaust chamber unit disposed immediately beside the compression chamber and having two relatively movable walls which are relatively movable with respect to each other and are shaped so as to successively and gradually converge and diverge from each other during the course of their relative movement, c. at least one fixed volume firing cylinder disposed adjacent both the chamber units which has separate inlet and outlet ports, d. the intake and compression chamber unit having an intake port in communication with an air-fuel supply, and a compression port aligned with the inlet port of the firing cylinder, e. the expansion and exhaust chamber unit having an expansion port aligned with the outlet port of the firing cylinder and an exhaust port which communicates with atmosphere, f. means for moving the firing cylinder inlet and outlet ports successively from the compression to the expansion ports of the chamber units, g. means for firing the cylinder in the interval between registry of the compression port with the firing cylinder inlet port, and registry of the expansion port with the cylinder outlet port, h. separate movable gate means associated with the intake and compression chamber unit, and with the expansion and exhaust chamber unit, which extends into and blocks the entire cross-sectional area of the chambers to form an end wall, i. the gate means being in sliding contact with one of the relatively movable walls and being reciprocably movable with respect to one of the walls and being reciprocably movable with respect to one of the walls to accommodate the variance of cross-sectional area as the relatively movable walls converge and diverge with respect to each other, j. the gate means being movable with respect to the ports of the chamber units, k. the relatively movable walls of the chamber units at their closest point coming into direct sliding contact with each other to form a second end wall, l. the gate means and the moving point of contact of the relatively movable walls forming two end walls which act to continually vary the length of the chamber formed between them, m. the gate means having a gradually increasing volume chamber on one side thereof and a gradually decreasing volume chamber on the other side thereof.

2. The internal combustion engine of claim 1, wherein:

a. the firing cylinder is rotatably mounted within a rotor, b. the rotor contains the gas intake and expansion ports.

3. The internal combustion engine as set forth in claim 2, wherein:

a. the rotor is disposed within a sealed housing and rotatably mounted on a power output shaft.

4. The internal combustion engine as set forth in claim 3, wherein:

a. the housing has an internal annular surface in gas sealed engagement with the rotor, b. the rotor has a flat peripheral surface facing the annular surface of the housing, c. at least two portions of the peripheral surface of the rotor are substantially out of round to provide at least one cavity for the intake and compression chamber and at least one cavity for the expansion and exhaust chamber.

5. The internal combustion engine as set forth in claim 3, wherein:

a. the compression and exhaust chambers respectively have fuel gas supply and atmosphere vent ports in the rotor surface and are connected respectively to fuel gas supply and atmosphere venting passages in the rotor.

6. The internal combustion engine as set forth in claim 1, wherein:

a. the firing cylinder is rotatably mounted adjacent to the chamber units, b. the means for moving the firing cylinder inlet and outlet ports to the ports of the chamber units includes means for rotating the firing cylinder.

7. A rotary engine, comprising:

a. a rotatably mounted power output shaft, b. a rotor integrally mounted on the power output shaft and having a smooth radial surface, c. a gas-tight housing enclosing the rotor which has a smooth surface opposite the radial surface of the rotor, the opposing surfaces having a variable distance between them dependent upon their relative angular rotation, d. a variable volume intake and compression chamber having a compression sort and which is formed between the smooth surface of the housing and the facing continuous portion of the radial rotor surface on one side of a dividing flange disposed on a plane which passes through the rotor perpendicular to the output shaft, e. a variable volume expansion and exhaust chamber having an expansion sort and which is formed adjacent to the variable volume intake and compression chamber and the facing portion of the smooth surface of the housing and the smooth radial surface of the rotor on the other side of the dividing flange, f. a plurality of rotating firing chambers within a cylinder in the rotor adjacent one of the surfaces which rotate in a direction opposite to that of the rotor, g. each of the cylinder surfaces having a port connecting the rotating cylinder chambers and the rotor surface, h. means for firing the chambers as they move from the compression port to the expansion port whereby the expanded gases will flow into the expansion chamber enlarging the same and producing rotational movement as a result thereof.

8. The rotary engine as set forth in claim 7, wherein:

a. gate means are associated with each of the variable volume chambers for defining an end wall behind which the chamber area will vary as the rotor rotates within the housing.

9. The rotary engine as set forth in claim 8, wherein:

a. the rotor has lateral flat sides and the dividing flange is on a plane midway between the sides, b. each of the smooth radial surfaces on either side of the dividing flange has at least two flattened sections 180° apart, and angularly offset with respect to the set of flattened sections on the other side of the dividing flange.

10. The rotary engine as set forth in claim 8, wherein:
 a. uniformly rotating cylinders include three equal volume chambers spaced 120° apart and mounted on a common member,
 b. gear means connected to the common mounting member for the cylinders and to the housing for providing relative rotation of the cylinders with respect to the rotor.

11. The rotary engine as set forth in claim 8, wherein:
 a. the firing means includes a spark plug connected with each firing cylinder.

12. The rotary engine as set forth in claim 8, wherein:
 a. exhaust and intake passageways are provided through the rotor for passage of fuel gases and exhaust gases to and from the rotating cylinders.

13. The rotary engine as set forth in claim 12 and including:
 a. an axial passageway in the power output shaft in communication with the intake cavities.

14. A rotary engine as set forth in claim 12 and including:
 a. an annular passageway in the rotor concentric with the power output shaft and in communication with the exhaust cavities.

15. A rotary engine as set forth in claim 13 and including:
 a. an annular passageway in the rotor concentric with the power output shaft and in communication with the exhaust cavities.

16. The rotary engine as set forth in claim 8, wherein:
 a. the firing means includes a fuel injector for successively firing into each cylinder.

* * * * *

UNITED STATES PATENT OFFICE
CERTIFICATE OF CORRECTION

Patent No. 3,820,513          Dated June 28, 1974

Inventor(s)    Otto A. Buettner

It is certified that error appears in the above-identified patent and that said Letters Patent are hereby corrected as shown below:

Column 1, line 43, change "grammatically" to --graphically--.

Column 2, line 33, change "beigh" to --being--.

Column 3, line 19, change "respective" to --perspective--.

Column 3, line 29, delete "at least".

Column 5, line 18, change "behlnd" to --behind--.

Column 5, line 30, change "intake" to --inlet--.

Column 6, line 36, change "65" to --in--.

Column 8, line 64, delete "at least".

Signed and sealed this 29th day of April 1975.

(SEAL)
Attest:

RUTH C. MASON
Attesting Officer

C. MARSHALL DANN
Commissioner of Patents
and Trademarks